Dec. 9, 1952    J. J. SLOMER    2,620,824
ELECTRICALLY OPERATED FLUID RELEASE VALVE
Filed April 16, 1945    2 SHEETS—SHEET 1

INVENTOR
Joseph J. Slomer
Clarence F. Poole
ATTORNEY

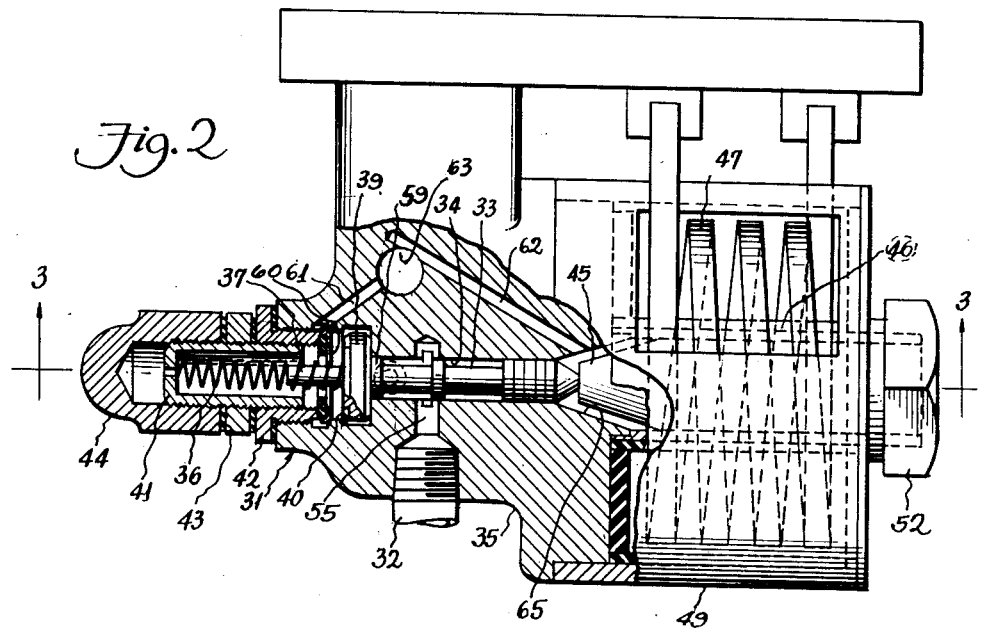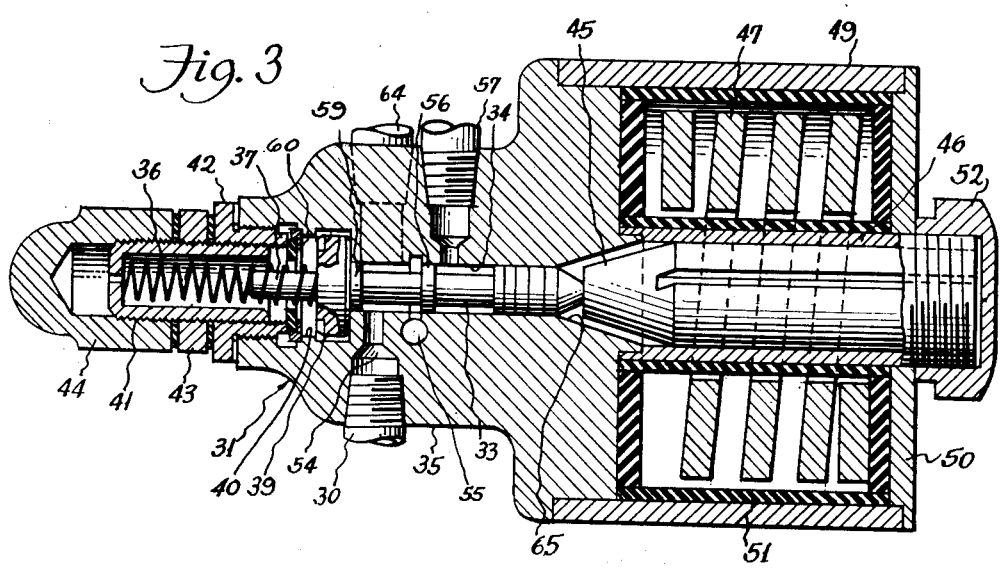

Patented Dec. 9, 1952

2,620,824

UNITED STATES PATENT OFFICE 2,620,824

ELECTRICALLY OPERATED FLUID RELEASE VALVE

Joseph J. Slomer, Chicago, Ill., assignor to Goodman Manufacturing Company, Chicago, Ill., a corporation of Illinois Application April 16, 1945, Serial No. 588,635

7 Claims. (Cl. 137—620)

This invention relates to improvements in electrically operated fluid release valves particularly adapted to control the opening of an electric circuit upon overload conditions in the circuit.

The principal objects of my invention are to provide a novel and improved electrically operated fluid release valve particularly adapted for use with a fluid operated controller and electrically connected in a motor circuit to release fluid from the fluid operated control system and cause the controller to open the motor circuit upon overload thereof and to lock the circuit in an open position until the controller is first turned to an off position.

An application Serial No. 518,245, filed by me January 14, 1944, now Patent Number 2,417,524, shows a fluid operated control circuit with an electrically controlled relief valve somewhat similar to that of my present invention. The device of my present invention, however, differs from that disclosed in my prior application in that the shunt interlocking coil shown in my prior application is dispensed with and the relief valve is instead provided with a hydraulic interlock.

These and other objects of my invention will appear from time to time as the following specification proceeds and with reference to the accompanying drawings wherein:

Figure 2 is a plan view of a release valve constructed in accordance with my invention, with certain parts broken away and certain other parts shown in substantially horizontal section; and Figure 3 is an enlarged sectional view taken substantially along line 3—3 of Figure 2.

Figure 1:
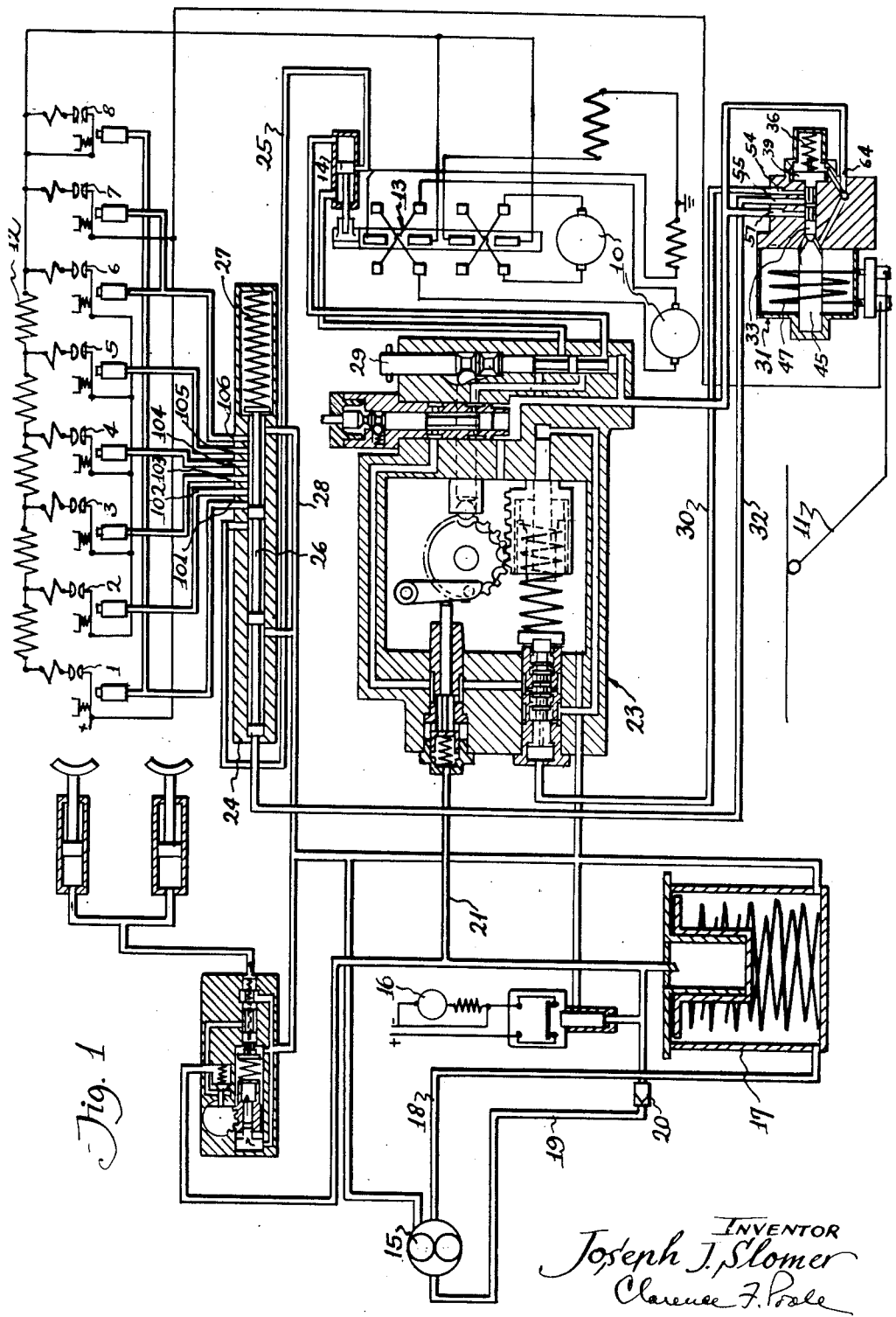
Figure 1 is a diagrammatic view illustrating an electrical control circuit for the motors of an electrical device such as a mine locomotive and diagrammatically showing a valve constructed in accordance with my invention connected in said electrical control circuit and in the fluid circuit for operating said control circuit.

An electrical control circuit particularly adapted to control the simultaneous operation of a plurality of electric motors 10, 10, preferably the motors of a mine locomotive, together with a hydraulic control system for operating the electrical contacts of this control circuit, is diagrammatically shown in Figure 1 for the purpose of illustrating a preferred application of the release valve of my invention. Said motors are herein shown as being connected in parallel for simplicity, it being understood that the control circuit may be so arranged as to connect said motors in series or in series parallel, if desired.

Starting and stopping of said motors is controlled by a plurality of fluid operated contactors 1, 2, 3, 4, 5, 6, 7 and 8, arranged to connect said motors to a main power line 11 and to progressively cut sections of a resistance 12 into or out of the circuit for said motors, in a well known manner. Reversal of the direction of rotation of said motors is controlled by a reverse drum 13 operated by a double acting fluid operated cylinder and piston 14.

A pump 15 driven by an electric motor 16 is provided to supply fluid under pressure to operate the contactors 1, 2, 3, 4, 5, 6, 7 and 8. Said pump obtains fluid from a fluid storage tank, herein shown as being the low pressure side of an accumulator 17, through a pipe 18, and supplies fluid under pressure to the high pressure side of said accumulator through a pipe 19 having a check valve 20 connected therein. Said accumulator may be of any well known form and is no part of my present invention so is not herein shown or described in detail.

A pressure pipe 21 leads from the high pressure side of the accumulator 17 to a variable pressure control valve indicated generally by reference character 23. Said control valve is of a type similar to that shown and described in my aforementioned Patent No. 2,417,524, so will not herein be shown or described in detail. Said variable pressure control valve is adapted to supply fluid under pressure to a distributor valve 24 at pressures which progressively increase step by step, to operate said distributor valve and cause said valve to successively supply fluid under pressure to the fluid pressure operated contactors 1 to 8 inclusive, for operating said contactors in a predetermined order.

Pressure enters said distributor valve at the pressure supplied by the accumulator 17 through a pipe 25 connected with the cylinder and piston 14 which, besides serving as a means for operating the reverse drum 13, also serves as a hydraulically operated valve to control the supplying of fluid under pressure to the distributor valve, and serves as an interlock to prevent the supplying of fluid under pressure to said distributor valve when said reverse drum is in an intermediate position between a forward and a reverse position. The supply of fluid under pressure to said cylinder and piston is controlled by means of a reverse valve 29 in a manner clearly shown and described in my aforementioned Patent No. 2,417,524, so not herein shown or described in detail.

When the handle controlling operation of the variable pressure control valve 23 is turned in one direction, fluid under pressure will be supplied to the distributor valve 24 through a pipe 30, an electrically operated relief valve 31 and a pipe 32, at pressures progressively increasing step by step, to move a valve piston 26 of said valve against a spring 27 and to progressively open ports 101, 102, 103, 104, 105 and 106 of said distributor valve to fluid under pressure supplied by the pipe 25. Said ports lead to the fluid operated contactors 1 and 8, and 2, 3, 4, 5, and 6 and 7 respectively, to close said contactors in the order just mentioned. When said control handle is turned in an opposite direction, fluid will be released from said distributor valve at pressures progressively decreasing step by step, to permit the spring 27 to move the piston 26 in a direction to release fluid from the contactors 6 and 7, and 5, 4, 3, 2, and 1 and 8 respectively, to the low pressure side of the accumulator 17 through a return pipe 28.

Referring now to the novel form of relief valve of my invention, which is electrically connected in the electrical circuit for supplying power to the motors 10, 10 and is connected in the hydraulic circuit for operating the contactors to release fluid pressure from the distributor valve 24, to permit the spring 27 of said distributor valve to move the piston 26 to the left to progressively open the port openings 106, 105, 104, 103, 102 and 101 to the return and permit opening of the contactors 7 and 6, and 5, 4, 3, 2, and 8 and 1, to open the circuit to the motors 10, 10 step by step, upon overload thereof, said relief valve, as herein shown, includes a valve spool 33 slidably mounted in a chamber 34 formed in a valve block 35. A compression spring 36 serves to hold said spool in an open position, to permit fluid under pressure to flow through the pipe 32 to the distributor valve 24, to operate said distributor valve. Said spring encircles a reduced end 37 of said valve spool and abuts the outer end of a piston 39 formed integrally with said valve spool. Said piston is of a larger diameter than said valve spool and is movable within an enlarged portion 40 of said valve chamber, and serves to lock said valve in a closed position against said compression spring, to prevent fluid under pressure from passing from the pipe 30 to the pipe 32, as will hereinafter more clearly appear as this specification proceeds. The end of said spring opposite from said piston abuts the closed end of a threaded sleeve 41, threaded within a bushing 42, which in turn is threaded within a drill hole formed in the end of said valve block, concentric with the chamber 34. A nut 43 and internally threaded cap piece 44 are threaded on said sleeve, to lock said threaded sleeve in position and to close the end of the block of said valve.

The end of the valve spool 33 opposite from the spring 36 abuts the inner end of an armature 45 of a solenoid provided with a coil 47. Said armature is slidably mounted within a sleeve 46. Said sleeve is secured to and extends outwardly from the valve block 35 and is encircled by a series coil 47 connected in series with the main power line 11, which series coil forms the coil of the solenoid, for causing said armature to move said valve spool against the compression spring 36 upon overload conditions on said power line, to move said valve spool to a position to block the flow of fluid to the distributor valve 24 and to permit the flow of fluid from said distributor valve to the return. While the operating coil of the solenoid is herein shown as being a series coil, it is understood that a shunt coil may be substituted for the series coil if desired.

The series coil 47 is contained in a cylindrical casing 49 mounted on and projecting outwardly from the valve block 35 and abutted at its outer end by a cover 50. Suitable insulating material indicated generally by reference character 51, insulates said coil from said sleeve, valve block, casing and cover. A nut 52 is threaded on the outer end of said sleeve to hold said cover to said casing.

A pressure passageway 54 communicates with the pipe 30 and enters the valve chamber 34 adjacent the left-hand portion thereof. A pressure passageway 55 communicates with the valve chamber 34 to the right of said pressure passageway 54. Said pressure passageway communicates with the pipe 32, which is connected with the distributor valve 24.

The valve spool 33 is provided with a land 56, just to the right of the pressure passageway 55. Said land serves to block the passage of fluid from the pressure passageway 54 through a relief passageway 57 when the valve is held in an open position by the spring 36, and also serves to block the passage of fluid from the pressure passageway 54 through the passageway 55. When said valve spool has been moved to a position to block the passage of fluid from the passageway 54 to the passageway 55, fluid will flow through said valve from the passageway 55, to and through the relief passageway 57, and to the low pressure side of the accumulator 17 through the block of the valve 23. A land 59 is provided on said valve spool 33 just to the left of the pressure passageway 54. Said land abuts the inner side of the piston 39 and serves to balance the pressure in the valve chamber 34.

When the armature 45 has moved the valve spool 33 a distance sufficient to block the passage of fluid from the passageway 54 through the passageway 55, the land 59 will be moved to the left a distance sufficient to permit fluid under pressure to pass through the valve chamber 34 into the enlarged portion 40 of said valve chamber and engage the right-hand side of the piston 39 to hold the left-hand side of said piston against a packing gland 60. The effective area of the piston 39 is considerably greater than that of the land 56 on spool 33, said effective area of said piston being sufficient when under fluid pressure from the end of the valve chamber 34, as described, to overcome the effect of the spring 36 and lock the valve in a closed position, thus preventing the passage of fluid under pressure through the passageway 55 and pipe 32 until pressure has been relieved from the valve chamber 34 and pipe 30 an amount sufficient to permit the spring 36 to move said valve spool to the right to an open position.

Drain passageways 61 and 62 communicate with a return passageway 63 and serve to permit fluid which may leak by said valve spool to pass to the return through a drain pipe 64. The passageway 61 is connected with the enlarged portion 40 of the valve chamber just to the left of the packing gland 60, to return fluid to the tank which may leak by the piston 39 and said packing gland to the tank. The passageway 62 is connected with the valve chamber 34 to the right of said valve spool.

It may be seen from the foregoing that upon overload of the power line 11 or the motors 10, 10, the series coil 47 will be sufficiently excited to move the armature 45 into an extreme position to the left against the spring 36, and the land 56 will block the passage of fluid from the passageway 54 to the passageway 55 and will permit fluid to flow from the passageway 55 out of the valve to the return through the passageway 57. This will release pressure from the pressure line 32 and will cause the spring 27 of the distributor valve 24 to progressively open the ports 106 to 101 to the return to cause the contactors 7 and 6, and 5, 4, 3, 2, and 8 and 1 to open. Pressure entering the valve chamber through the pipe 30 will hold the valve in a closed position against the spring 36 and will prevent closing of the motor circuit until the variable pressure control valve 23 has been turned to an off position. When said control valve has been turned to an off position, the release of pressure from the pipe 30 will permit the spring 36 to move the valve spool 33 to an open position to again permit fluid under pressure to pass through said valve from the pipe 30 through the pipe 32 to the distributor valve, to operate said distributor valve and close the contacts 1 to 8 in a predetermined order.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a solenoid operated relief valve, a valve block having a valve chamber therein, a pressure inlet leading into said valve chamber adjacent an end thereof, a pressure outlet spaced inwardly along said chamber from said pressure inlet and leading therefrom, a relief outlet spaced toward the opposite end of said chamber from said pressure inlet and said pressure outlet and leading from said chamber, a valve spool slidable in said chamber and having a pair of spaced lands, one of which normally closes the end of said chamber adjacent said pressure inlet and the other of which is spaced inwardly from said pressure inlet passage, a spring biasing said valve spool into position to close the end of said chamber adjacent said pressure inlet and to block the passage of fluid from said pressure inlet to said relief outlet and to define a passage between said pressure inlet and said pressure outlet for the flow of fluid therethrough, a solenoid having an armature operatively connected with said valve spool and moving said valve spool into position to define a fluid passageway from said pressure inlet through the end of said chamber, and to define a fluid passageway from said pressure outlet to said relief outlet, upon energization of said solenoid, a chamber portion of enlarged diameter communicating with the end of said valve chamber adjacent said pressure inlet, a piston slidably movable in said chamber portion of enlarged diameter and connected with said valve spool and having a greater effective area than the effective area of said land spaced inwardly from said pressure inlet, said armature moving the outer of said lands into said enlarged chamber portion to pass fluid from said pressure inlet to exert pressure against said piston to hold said valve in a position to pass fluid from said pressure outlet to said relief outlet until pressure in said pressure inlet drops below a predetermined value.

2. In a solenoid operated relief valve, a valve block having a valve chamber therein and a communicating aligned chamber of larger diameter than said valve chamber, a fluid pressure inlet leading into said valve chamber adjacent said chamber of enlarged diameter, a pressure outlet leading from said chamber and spaced from said pressure inlet, a relief outlet leading from said chamber and spaced therealong from said pressure inlet and said pressure outlet, a valve spool slidable in said chamber and having a pair of spaced lands, one of said lands normally blocking the passage of fluid into said chamber of increased diameter, and the other of said lands normally blocking the passage of fluid from said pressure inlet through said relief outlet, a spring urging said valve spool into position to block the passage of fluid from said pressure inlet through said relief outlet, and to provide a passage for the flow of fluid from said pressure inlet through said pressure outlet, a solenoid having an armature operatively connected with said valve spool and energizable to move said valve spool against said spring into position to define a fluid passageway from said pressure inlet into said chamber of enlarged diameter, and block the flow of fluid from said pressure inlet through said pressure outlet and define a fluid passageway from said pressure outlet through said relief outlet, and said valve spool having a piston thereon movable within said chamber of enlarged diameter and having a greater effective area than the land normally blocking the passage of fluid through said relief outlet and holding said valve in position when subjected to pressure from said inlet, to define a fluid passage from said pressure outlet through said relief outlet until pressure in said pressure inlet drops below a predetermined value.

3. In a solenoid operated relief valve, a valve chamber having an open end, a valve spool slidable along said chamber, a pressure inlet leading into said chamber, a pressure outlet leading from said chamber and spaced along said chamber from said pressure inlet, a relief outlet leading from said chamber and spaced from said pressure outlet in the direction said pressure outlet is spaced from said pressure inlet, said valve spool having two spaced lands thereon of equal effective area, means biasing said valve spool and lands into position to define a fluid passage between said lands from said pressure inlet through said pressure outlet, a solenoid having an armature engaging said valve spool and energizable to move said valve spool into a position wherein one of said lands is out of said chamber to provide a fluid passage from said pressure inlet through the open end of said valve chamber, and the other of said lands is in position to block the flow of fluid from said pressure inlet to said pressure outlet, and to provide a fluid passage from said pressure outlet to said relief outlet, a piston on said valve spool subject to fluid pressure from the open end of said valve chamber and of an effective area sufficient to hold said valve spool against said biasing means in position to release pressure from said pressure outlet upon deenergization of said solenoid and until fluid pressure in said pressure inlet drops to a predetermined value.

4. In a solenoid operated relief valve, a valve block having a valve chamber therein, a spring biased valve spool movable along said chamber, a pressure inlet leading into said valve chamber adjacent one end thereof, a pressure outlet leading from said chamber and spaced from said pressure inlet inwardly along said chamber, a relief outlet leading from said chamber and spaced inwardly along said chamber from said pressure inlet and said pressure outlet, said valve spool having a plurality of spaced lands thereon positioned by the bias of said spring, to define a passageway between said pressure inlet and said pressure outlet, a chamber of larger diameter than said valve chamber communicating with the end of said valve chamber adjacent said pressure inlet, one of said lands blocking fluid communication between said chambers by the spring bias of said valve spool, a solenoid having an armature and energizable to move said valve spool against its spring bias into a relief position with said one of said lands positioned to admit fluid from said pressure inlet to said enlarged diameter chamber, and with the other of said lands in position to pass fluid from said pressure outlet through said relief outlet, and said valve spool having a piston thereon slidably movable in said enlarged diameter chamber, of an effective area sufficient to hold said valve spool in a relief position against its spring bias upon deenergization of said solenoid, and until pressure in said pressure inlet drops below a predetermined value.

5. In a solenoid operated relief valve, a valve body including a substantially uniform diameter valve chamber having an aligned chamber portion of increased diameter in communication therewith, an inlet pressure port into said valve chamber adjacent said chamber portion of increased diameter, an outlet pressure port from said valve chamber and spaced along said valve chamber from said inlet port and said chamber portion, a relief pressure port spaced along said chamber from said outlet pressure port and said chamber portion, a spring-biased valve member movable in said valve chamber having valve means thereon biased to accommodate the passage of fluid from said inlet port to said outlet port and to block the passage of fluid in one direction through said relief port and in an opposite direction to said enlarged diameter chamber and pressure balanced when in its spring-biased position, a piston on said valve member within said enlarged diameter chamber portion having sufficient surface area to hold said valve spool against its spring bias when subjected to fluid under pressure from the end of said valve chamber, a solenoid having an armature energizable to move said valve member and said valve means into position to define a fluid passageway from said inlet pressure port to said chamber portion and from said outlet pressure port to said relief port, and unbalance the pressure acting on said valve means and hold said valve member in position against its spring bias upon deenergization of said solenoid by the pressure of fluid acting on said piston until the pressure in said inlet pressure port drops below a predetermined value.

6. In a solenoid operated relief valve, a valve body including a valve chamber having a chamber portion of enlarged diameter communicating with an end thereof, an inlet pressure port leading through a wall of said valve chamber adjacent said enlarged diameter portion, an outlet pressure port leading through a wall of said chamber and spaced inwardly therealong from said chamber portion and said inlet port, a relief port leading through a wall of said chamber and spaced inwardly therealong from said outlet and inlet ports, a spring-biased valve member movable along said valve chamber and having two spaced lands balancing pressure on said valve member when in its spring-biased position and biased to define a passageway from said inlet port to said outlet port and to close the end of said chamber communicating with said enlarged diameter portion, a piston on the end of said valve member adjacent said land closing the end of said valve chamber and movable along said enlarged diameter chamber portion, a solenoid having an armature engageable with the end of said valve member opposite said piston, said armature being actuated upon energization of said solenoid and moving said valve member to position said lands to pass fluid from said inlet pressure port to said enlarged diameter portion and from said outlet pressure port to said relief port, said piston being of sufficient surface area when subjected to pressure from said inlet pressure port, to hold said valve member in position against its spring bias to pass fluid through said relief port irrespective of the condition of said solenoid until the pressure in said inlet pressure port drops below a predetermined value.

7. In a solenoid operated relief valve, a valve body having a valve chamber therein having an enlarged diameter chamber portion communicating with an end thereof, said valve chamber having an inlet pressure port leading through a wall thereof adjacent said enlarged diameter chamber portion, an outlet pressure port spaced along said wall from said inlet port and said enlarged diameter chamber portion and a relief port leading from a wall of said chamber and spaced from said inlet and outlet ports, a valve member movable along said chamber and having a plurality of spaced lands thereon of equal effective area and a piston on an end thereof within said enlarged diameter chamber portion of a greater effective area, a spring biasing said valve member into position to define a fluid passageway between said lands from said inlet pressure port to said outlet pressure port and to block the passage of fluid into said chamber portion of enlarged diameter, a solenoid including an armature actuating said valve member upon energization of said solenoid to position said lands to define a fluid passage from said inlet port to said enlarged diameter chamber portion and from said outlet pressure port to said relief port, and said piston being of sufficient surface area to overcome the bias of said spring when subjected to pressure from said pressure port and hold said valve in position to pass fluid from said outlet pressure port to said relief port until the pressure in said inlet pressure port drops below a predetermined value.

JOSEPH J. SLOMER.

REFERENCES CITED

The following references are of record in the file of this patent:

UNITED STATES PATENTS

| Number | Name | Date |
|---|---|---|
| 1,138,278 | Castle | May 4, 1915 |
| 1,281,543 | Farmer | Oct. 15, 1918 |
| 1,623,557 | Rybeck | Apr. 5, 1927 |
| 1,649,900 | Holdsworth | Nov. 22, 1927 |
| 1,897,490 | Noble | Feb. 14, 1933 |
| 1,921,092 | Newton | Aug. 8, 1933 |
| 2,255,496 | Wyman | Sept. 9, 1941 |
| 2,389,942 | Thumin et al. | Nov. 27, 1945 |